United States Patent [19]

Hiratsuka

[11] Patent Number: 4,907,853
[45] Date of Patent: Mar. 13, 1990

[54] OPTICAL CONNECTOR USING A POLARIZATION-MAINTAINING OPTICAL FIBER

[75] Inventor: Toshio Hiratsuka, Tokyo, Japan
[73] Assignee: NEC Corporation, Japan
[21] Appl. No.: 117,627
[22] Filed: Nov. 5, 1987
[30] Foreign Application Priority Data Nov. 6, 1986 [JP] Japan ................. 61-262683

[51] Int. Cl.$^4$ ............................................. G02B 6/36
[52] U.S. Cl. ........................ 350/96.20; 350/96.29; 350/96.30
[58] Field of Search ............... 350/96.20, 96.29, 96.30

[56] References Cited

U.S. PATENT DOCUMENTS

| | | | |
|---|---|---|---|
| 4,610,506 | 9/1986 | Tokunaga et al. | 350/96.3 |
| 4,673,244 | 6/1987 | Miles | 350/96.2 |
| 4,805,986 | 2/1989 | Weissert | 350/96.3 |

FOREIGN PATENT DOCUMENTS

| | | | |
|---|---|---|---|
| 0095704 | 6/1983 | Japan | 350/96.2 |
| 0223103 | 12/1983 | Japan | 350/96.29 |
| 0237406 | 11/1985 | Japan | 350/96.3 |
| 0254008 | 12/1985 | Japan | 350/96.2 |
| 0009608 | 1/1986 | Japan | 350/96.3 |

OTHER PUBLICATIONS

Sasaki et al., "Fabrication of Polarization-Maintaining Optical Fibers With Stress-Induced Birefringence", *Review of the Electrical Communication Laboratories,* vol. 32, No. 13, pp. 452-460, (1984).
Stolen et al.; "High Birefringence-Preform Deformation"; Journal of Lightwave Technology, vol. LT-2, No. 5; 10/1984; pp. 639-641.

Primary Examiner—William L. Sikes
Assistant Examiner—Xuan Thi Vo
Attorney, Agent, or Firm—Leydig, Voit & Mayer

[57] ABSTRACT

An optical connector is disclosed which comprises a polarization-maintaining optical fiber inserted into an oval hole in a ferrule and fixed in the hole by an adhesive. The major axis of the oval hole coincides with the direction in which stress is applied to the polarization-maintaining optical fiber and the minor axis of the hole is approximately equal to the diameter of the polarization-maintaining optical fiber.

20 Claims, 2 Drawing Sheets

OPTICAL CONNECTOR USING A POLARIZATION-MAINTAINING OPTICAL FIBER

BACKGROUND OF THE INVENTION

The present invention relates to an optical connector using a polarization-maintaining optical fiber.

Optical fibers with high internal birefringence have been developed to maintain the polarization plane of the transmitted light over a long distance. In the most common type of polarization-maintaining optical fiber, the birefringence is caused by a stress anisotropy in the core. The stress anisotropy is achieved by doping a material of a larger thermal expansion coefficient than that of the silica substrate. As an example of such a polarization-maintaining optical fiber is well known the structure described by Y. Sakaki et al. in "Fabrication of Polarization-Maintaining Optical Fibers with Stress-Induced Birefringence", REVIEW of the Electrical Communication Laboratories, Vol. 32, No. 3, 1984. The optical fiber described in the paper comprises a core and parts arranged around the core and applying stress to the core in a fixed direction. In the optical fiber, by making one of two orthogonal polarization planes of the light coming incident on the optical fiber coincident with the direction of the stress on the core (main stress direction), the polarization plane of the light propagating over the core is maintained in the direction of that stress. However, if some external force prevents from maintaining the polarization plane, the polarization plane will rotate to invite deterioration in the polarization extinction ratio (power ratio of the two orthogonal polarization). Therefore, utmost attention has to be paid to maintaining the polarization plane. However, as no adequate attention is paid to the preservation of the polarization plane in a conventional optical connector using a polarization-maintaining optical fiber, there is the problem of rotation of the polarization plane, resulting in a substantial deterioration of the polarization extinction ratio.

To further elaborate on this point, in a conventional optical connector, when a polarization-maintaining fiber is fixed within a hole of a ferrule made of glass or some other ceramic with adhesive, the fiber is fixed off the center of the hole, resulting in uneven thickness of the adhesive layer. The uneven thickness of the adhesive layer, affecting the fiber as an external stress at the time of hardening of the adhesive, disturbs the direction of the internal stress applied in advance to the fiber. As a consequence, the polarization plane will rotate in response to the external stress, inviting a substantial deterioration in the polarization extinction ratio.

If a polarization-maintaining fiber having a polarization extinction ratio of over 40 dB, for instance, is used in a conventional optical connector, the polarization extinction ratio will deteriorate to somewhere between 15 and 40 dB, resulting in a fluctuation of the deterioration of the polarization extinction ratio from about 0 to 25 dB.

SUMMARY OF THE INVENTION

An object of the present invention, therefore, is to provide an optical connector whose polarization plane is free from rotation by the stresses resulting from the hardening of adhesive when a polarization-maintaining optical fiber is fixed with the adhesive to the inside of the ferrule of the optical connector.

Accordingly, the present invention provides an optical connector using a polarization-maintaining optical fiber and comprising a polarization-maintaining optical fiber for maintaining the polarization plane by applying stress in a direction perpendicular to the optical axis of the optical fiber. The optical fiber includes a core and a stress-applying mechanism arranged symmetrically with respect to the core. The connector also comprises a ferrule into which the polarization-maintaining fiber is inserted. The section of the ferrule perpendicular to the optical axis of the fiber has an oval hole. The major axis of the oval hole coincides with the direction in which the stress is applied to the core of the polarization-maintaining optical fiber, and the minor axis of the oval hole is approximately equal to the diameter of the polarization-maintaining optical fiber. The connector further comprises an adhesive for fixing the polarization-maintaining optical fiber in the oval hole.

The invention also provides optical connector comprising an optical fiber which has an optical axis. The optical fiber includes a core and a stress-applying mechanism arranged symmetrically with respect to the core for maintaining a polarization plane by applying stress to the core in a direction perpendicular to the optical axis. The optical connector also comprises a member which has a hole in which the optical fiber is fixedly positioned. The hole has first and second dimensions perpendicular to the optical axis of the optical fiber. The first dimension is larger than the second dimension and is coincident to the direction of stress.

The invention further provides an optical connector comprising a fiber cord, a ferrule, and a housing assembly. The fiber cord includes a polarization-maintaining optical fiber which maintains the polarization plane of transmitted light and which has an optical axis. The optical fiber includes a core and stress-applying mechanism arranged symmetrically with respect to the core for maintaining a polarization plane by applying stress to the core in a direction perpendicular to the optical axis. The ferrule has a hole and the polarization-maintaining optical fiber is fixedly positioned in the hole. The hole has first and second dimensions perpendicular to the optical axis, and the first dimension is larger than the second dimension and coincident with the applied direction of stress. The housing assembly includes a front part disposed around the ferrule and a rear part disposed around the fiber cord.

The present invention additionally provides an optical connector using a polarization-maintaining optical fiber and comprising a polarization-maintaining optical fiber arrangement and a ferrule. The optical fiber arrangement, which guides an incident light beam while maintaining a polarization plane of the light beam, and has a core, a clad for cladding the core, and a stress-applying mechanism. The stress-applying mechanism is contained within the clad and arranged symmetrically with respect to the core for stressing the core in a direction perpendicular to the optical axis of the optical fiber arrangement. The ferrule assembly, which houses the polarization-maintaining fiber arrangement, has a hole parallel to a ferrule axis. The hole has an oval shape in a section of the ferrule assembly perpendicular to the optical axis. The major axis of the oval-shaped hole coincides with the direction of stress and the length of the minor axis of the oval hole is approximately equal to the diameter of the polarization-maintaining optical fiber arrangement. The optical connector further comprises an adhesive placed mainly in the gaps formed by an internal wall of the ferrule assembly and the polarization-maintaining optical fiber arrangement. The adhesive fixes the polarization-maintaining optical fiber arrangement in the hole.

BRIEF DESCRIPTION OF THE DRAWINGS

The present invention will be better understood from the following detailed description taken in conjunction with the accompanying drawings, in which.

DETAILED DESCRIPTION OF THE PREFERRED EMBODIMENT

Figure 1A:
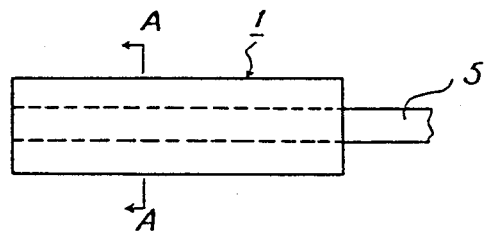
FIG. 1A shows a front view of one preferred embodiment of the invention.
Figure 1B:
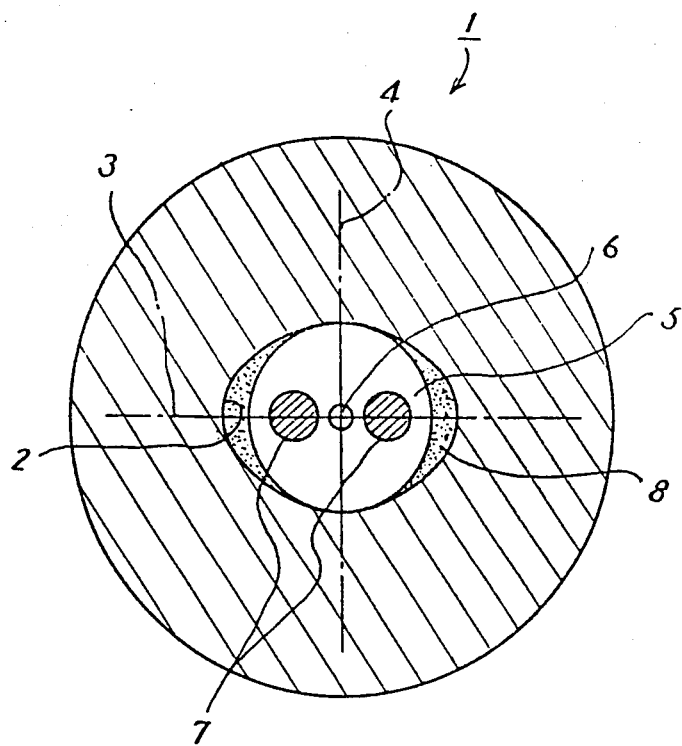
FIG. 1B is an enlarged A—A section of FIG. 1A.

FIG. 1A shows a front view of the embodiment, and FIG. 1B is an enlarged A—A section of FIG. 1A.

In FIGS. 1A and 1B, an oval hole 2 is opened in the direction of the central axis of a glass-made ferrule 1 for connecting a polarization-maintaining optical fiber 5. The minor axis 4 of the oval hole 2 is set equal to the diameter of the fiber 5 so that adhesive 8 can concentrate in the area along the major axis 3 of the oval hole 2. The fiber 5 comprises a core 6 and a clad having a pair of stress-applying parts 7 arranged in symmetrical positions with respect to the core 6.

The stress-applying parts 7 are doped with 15 mol % of $B_2O_3$ to enlarge the coefficient of thermal expansion, and the core 6 and the clad surrounding it are primarily made of $SiO_2$, whose coefficient of thermal expansion is smaller than that of the stress-applying parts 7. Therefore, during the production of the optical fiber 5, the thermally expanded stress-applying parts 7 contract when the optical fiber cools off, and pull the surrounding $SiO_2$. As a result, the core 6 is pulled toward the stress-applying parts 7, and this pulling force turns into the stress applied to the core 6. The fiber 5 is so fixed in the oval hole 2 with the adhesive 8 that the line connecting the two stress-applying parts 7 of the fiber 5 substantially coincides with the major axis 3 of the hole 2. The adhesive 8, of an ultraviolet-hardened type, is hardened by irradiating ultraviolet rays from outside the glass-made ferrule 1.

In this embodiment, since the adhesive 8 concentrates in the area along the major axis 3, the direction of stress applied to the core 6 by the hardening and contraction of the adhesive 8 is substantially identical with that of the stress attributable to the stress-applying parts 7. As a result, there is no rotation of the polarization plane by the hardening of the adhesive 8, and a fluctuation of deterioration in the polarization extinction ratio is reduced to no more than 10 dB.

Although the Sakaki-proposed type optical fiber is used for maintaining the polarization plane in the aforementioned embodiment, an optical fiber of any other structure may as well be used only if stress is applied to its core in a monoaxial direction perpendicular to the central axis. It also should be noted that adhesive need not be an ultraviolet-hardened type.

Figure 2:
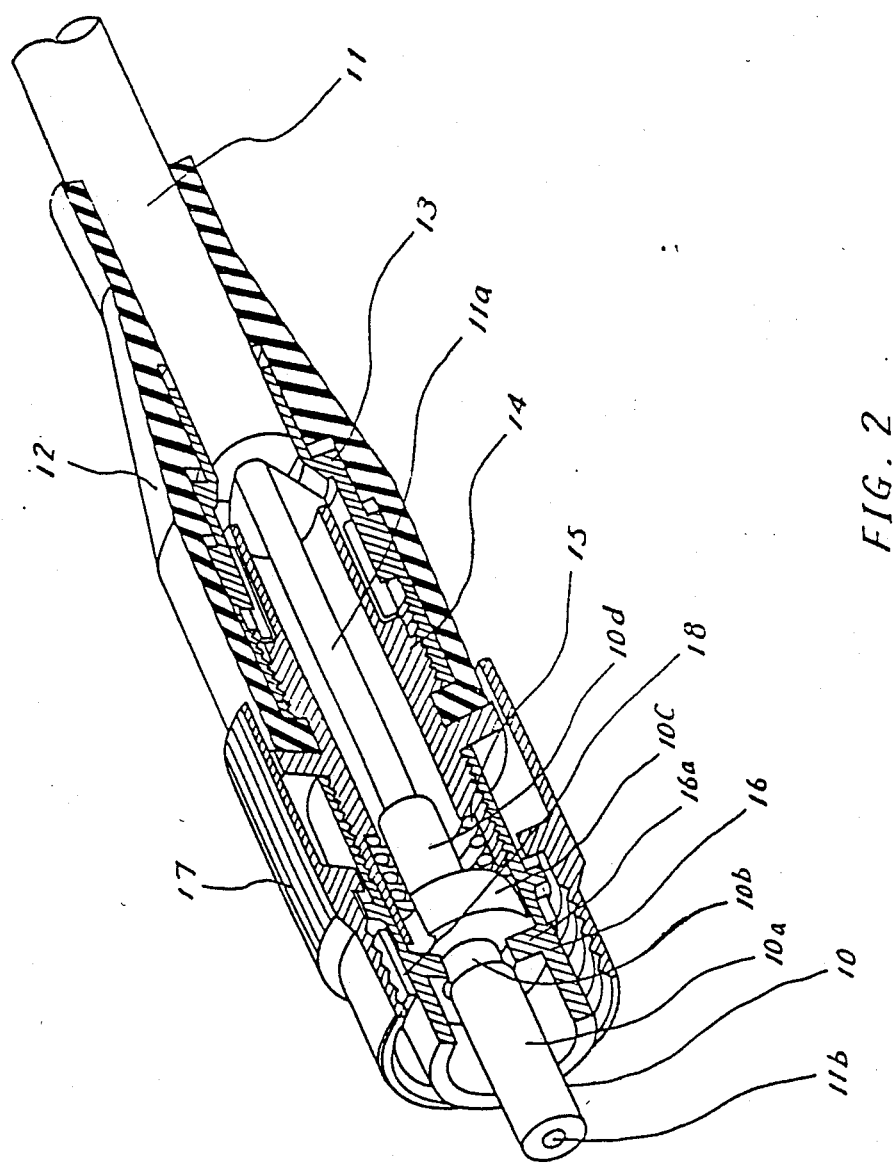
FIG. 2 is a partially cut-out oblique view of the embodiment of the invention.

FIG. 2 is a partially cut-out oblique view of an optical connector having the ferrule illustrated in FIGS. 1A and 1B. To simplify description, the direction of the tip of the ferrule is supposed to be forward, and the reverse direction, backward. In the figure, a fiber cord 11 is inserted in the rear part of a rubber boot 12 and, a cylindrical member 13 in the front part thereof. The rear part of the cylindrical member 13 fixes the fiber cord 11, and the front part of the cylindrical member 13 is screwed into a housing 14. The housing 14 is arranged around a coated fiber 11a, resulting from the fiber cord 11 being stripped of its external cover, and into its front part are inserted a spring 15 and the rear part of a ferrule 10. The external circumference of the front part of the housing 14 is screwed to the rear part of a frame 16. The ferrule 10 comprises first, second, third and fourth cylindrical parts 10a, 10b, 10c and 10d, each differing in diameter from others. The first cylindrical part 10a has an oval hole, in which is fixed a bare fiber 11b with adhesive. The bare fiber 11b results from the elimination of the silicon coat from the coated fiber 11a, and corresponds to the polarization-maintaining optical fiber of FIG. 1B. Therefore, its section perpendicular to the central axis of the first cylindrical part 10a is the same as what is shown in FIG. 1B. The coated fiber 11a is inserted and fixed within the second through fourth cylindrical parts 10b to 10d. Around the second cylindrical part 10b is arranged a flange 16a of the frame 16, and the flange 16a and the third cylindrical part 10c serve as stoppers to limit the shifting of the ferrule 10 in the direction of its central axis.

A location key 18 is fixed partially on the external circumference of the front part of the frame 16. The location key 18 operates to position and prevent the rotation of the frame 16 when the optical connector is connected to an adapter. The key 18 is fixed in alignment with the direction of internal stress to represent the direction of the internal stress attributable to the stress-applying parts of the bare fiber 11b. A coupling nut 17 is arranged on the external circumference of the frame 16, and on its front part is formed a thread for fitting with an optical adaptor.

As hitherto described, the present invention makes it possible, when a polarization-maintaining optical fiber is fitted to an optical connector ferrule, to reduce the deterioration of the polarization extinction ratio and further to minimize its fluctuation.

What is claimed is:

1. An optical connector using a polarization-maintaining optical fiber, comprising:

polarization-maintaining optical fiber means for maintaining a polarization plane by applying stress in a direction perpendicular to the optical axis of the optical fiber means, said optical fiber means including a core and stress-applying means arranged symmetrically with respect to the core;

ferrule means into which said polarization-maintaining fiber means are inserted, and whose section perpendicular to said optical axis has an oval hole, the major axis of said oval hole coinciding with the direction in which the stress is applied to said core of said polarization-maintaining optical fiber means, and the minor axis of the same being approximately equal to the diameter of said polarization-maintaining optical fiber means; and adhesive means for fixing said polarization maintaining optical fiber means in said hole.

2. An optical connector comprising:

an optical fiber which has an optical axis, a core, and stress-applying means arranged symmetrically with respect to the core for maintaining a polarization plane by applying stress to said core in a direction perpendicular to the optical axis; and a member which has a hole wherein the optical fiber is fixedly disposed in the hole, the hole has first and second dimensions perpendicular to the optical axis of the optical fiber, and the first dimension is larger than the second dimension and is coincident to the direction of stress.

3. The optical connector of claim 2 further comprising an adhesive disposed in the hole between the member and the optical fiber for fixing the member to the optical fiber.

4. The optical connector of claim 2 wherein the optical fiber includes a clad the core being centrally disposed within the clad.

5. The optical connector of claim 2 wherein the member comprises a ferrule.

6. The optical connector of claim 2 wherein the hole has an oval configuration.

7. The optical connector of claim 2 wherein the optical fiber has a generally cylindrical configuration and wherein the second dimension of the hole is substantially equal to the diameter of the optical fiber.

8. The optical connector of claim 2 wherein the first dimension of the hole is perpendicular to the second dimension.

9. The optical connector of claim 8 wherein the hole has a generally oval configuration including major and minor axes and wherein the first dimension extends along the major axis and the second dimension extends along the minor axis.

10. The optical connector of claim 9 wherein the optical fiber has a generally cylindrical configuration and the second dimension of the hole is substantially equal to the diameter of the optical fiber.

11. An optical connector comprising:
a fiber cord including a polarization-maintaining optical fiber which maintains the polarization plane of transmitted light and which has an optical axis, the optical fiber including a core and stress-applying means arranged symmetrically with respect to the core for maintaining a polarization plane by applying stress to said core in a direction perpendicular to the optical axis;
a ferrule including a hole, the polarization-maintaining optical fiber being fixedly disposed in the hole and the hole having first and second dimensions perpendicular to the optical axis, the first dimension being larger than the second dimension and coincident with the applied direction of stress; and
a housing assembly including a front part disposed around the ferrule and a rear part disposed around the fiber cord.

12. The optical connector of claim 11 further comprising a spring disposed between the housing assembly and the ferrule.

13. The optical connector of claim 11 wherein the optical fiber includes a clad disposed around the core, wherein the stress-applying means includes a pair of stress-applying parts arranged within the clad in symmetrical positions with respect to the core, and wherein the fiber cord further includes a silicon coat disposed around the optical fiber and an external cover disposed around the silicon coat.

14. The optical connector of claim 11 wherein the ferrule includes at least first, second, and third cylindrical parts, the diameter of the second cylindrical part being less than the diameter of the first cylindrical part and the diameter of the third cylindrical part being greater than the diameter of the first cylindrical part and wherein the hole has a oval configuration.

15. The optical connector of claim 11 wherein the housing assembly includes a cylindrical member having a rear part fixed to the fiber cord and a threaded front part, a housing member threaded to the cylindrical member and having a threaded front part, and a frame member having a threaded rear part which is threaded to the front part of the housing member.

16. The optical connector of claim 11 wherein the fiber cord further includes a silicon coat disposed around the optical fiber and an external cover disposed around the silicon coat; wherein the ferrule includes first, second, third, and fourth cylindrical parts, the second part having a diameter smaller than the first part and the third part having a diameter larger than the first or fourth parts; wherein the housing assembly includes a cylindrical member having a rear part fixed to the external cover of the fiber cord and a threaded front part, a housing member threaded to the front part of the cylindrical member and having a threaded front part, a frame member having a threaded rear part threaded to the front part of the housing member and a flange which abuts the third cylindrical part of the ferrule, and an elastomeric boot disposed around the cylindrical member and the fiber cord; and wherein the optical connector further comprises a spring disposed around the fourth part of the ferrule and extending between the housing member and the third cylindrical part of the ferrule, the coated optical fiber with the external cover stripped away extending between the rear part of the housing assembly and the ferrule and being fixed within the hole in the fourth, third, and second parts of the ferrule, and the optical fiber with the silicon coat stripped away being fixed within the hole in the first cylindrical part of the ferrule.

17. The optical connector of claim 16 wherein the housing assembly further comprises a coupler rotatably disposed around the frame for connecting the optical connector to an adaptor and a key fixed on the frame for positioning and preventing rotation of the frame when the optical connector is connected to the adaptor.

18. An optical connector using a polarization-maintaining optical fiber, comprising:
polarization-maintaining optical fiber means for guiding an incident light beam while maintaining a polarization plane of said incident light beam, said polarization-maintaining optical fiber means having a core, a clad for cladding the core, and stressed-applying means contained within the clad and arranged symmetrically with respect to the core for stressing the core in a direction perpendicular to the optical axis of the optical fiber means;
ferrule means for housing said polarization-maintaining fiber means, said ferrule means having an oval hole parallel to a ferrule axis and being of an oval shape in a section perpendicular to said optical axis, the major axis of said oval shape coinciding with said direction of stress and the length of the minor axis of the oval hole being approximately equal to the diameter of the polarization-maintaining optical fiber means; and
adhesive means, mainly placed in gaps formed by an internal wall of said ferrule means and said polarization-maintaining optical fiber means, for fixing said polarization-maintaining optical fiber means in said hole.

19. The optical connector of claim 18 wherein the stress-applying means includes a pair of stress-applying parts arranged in symmetrical positions with respect to the core.

20. The optical connector of claim 18 wherein the stress-applying parts include materials having a larger coefficient of thermal expansion than that of the remainder of the clad.

* * * * *